United States Patent [19]
Kemme

[11] 4,294,011
[45] Oct. 13, 1981

[54] TUBE CUTTER

[75] Inventor: Wendell J. Kemme, Redlands, Calif.

[73] Assignee: T/Drill, Inc., Ann Arbor, Mich.

[21] Appl. No.: 49,398

[22] Filed: Jun. 18, 1979

[51] Int. Cl.³ .................. B23D 21/06; B26B 27/00
[52] U.S. Cl. ..................................... 30/106; 30/108
[58] Field of Search .................. 30/106, 108, 104, 103

[56] References Cited

U.S. PATENT DOCUMENTS

| | | | |
|---|---|---|---|
| 514,985 | 2/1894 | Albert et al. | 30/108 |
| 646,907 | 4/1900 | Henrikson | 30/108 |
| 852,302 | 4/1907 | Strong | 30/108 |
| 969,507 | 9/1910 | Altman et al. | 30/108 |
| 1,835,651 | 12/1931 | Ihsen | 30/106 |
| 2,262,041 | 11/1941 | Pennella | 30/106 |
| 2,356,402 | 8/1944 | Haynes | 30/106 |
| 2,743,521 | 5/1956 | Oberhuber et al. | 30/106 |
| 2,764,812 | 10/1956 | Thornson | 30/106 |

FOREIGN PATENT DOCUMENTS 742693  1/1933  France .................................. 30/106

*Primary Examiner*—Stephen G. Kunin
*Assistant Examiner*—J. T. Zatarga
*Attorney, Agent, or Firm*—Olsen and Stephenson

[57] ABSTRACT

A tube trimming device for cutting each of a plurality of closely spaced projecting tubes an equal distance from a reference or support wall. The device comprises inner and outer tubular housing members that are telescoped together for relative sliding movement through a limited range of travel. A spring extends the two members. A stationary bushing is connected to the projecting end of the inner member to set the desired location of a cutter wheel rotatably mounted on one end of an arm that is pivotally connected to the inner member on the inside. The other end of the pivoted arm has a cam follower that rides on a conical cam surface of the outer member. The tubular inner member is inserted over the projecting end of the tube to be cut, with the stationary bushing pressed against the reference wall. The outer housing is rotatably driven by a motor while, at the same time, the outer housing is pushed toward the reference wall. Relative movement of the outer housing with respect to the inner housing causes the cam follower on the end of the pivoted arm to ride up the inclined cam surface, which causes the cutter wheel at the other end to cut through the tubing. The bushing can be removed and replaced with a longer or shorter bushing to change the location of the cut to be made in the tube with respect to the support wall.

4 Claims, 5 Drawing Figures

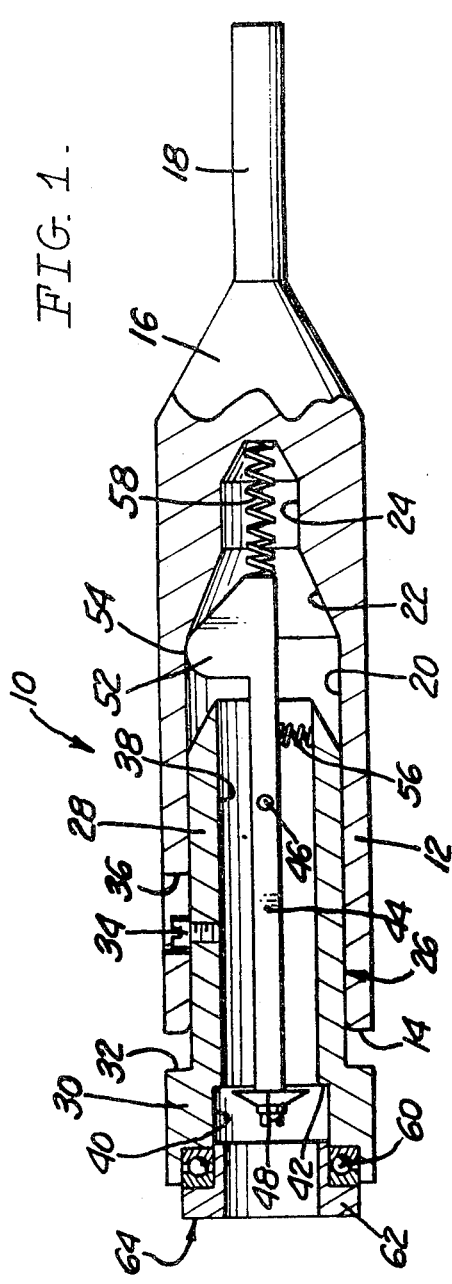
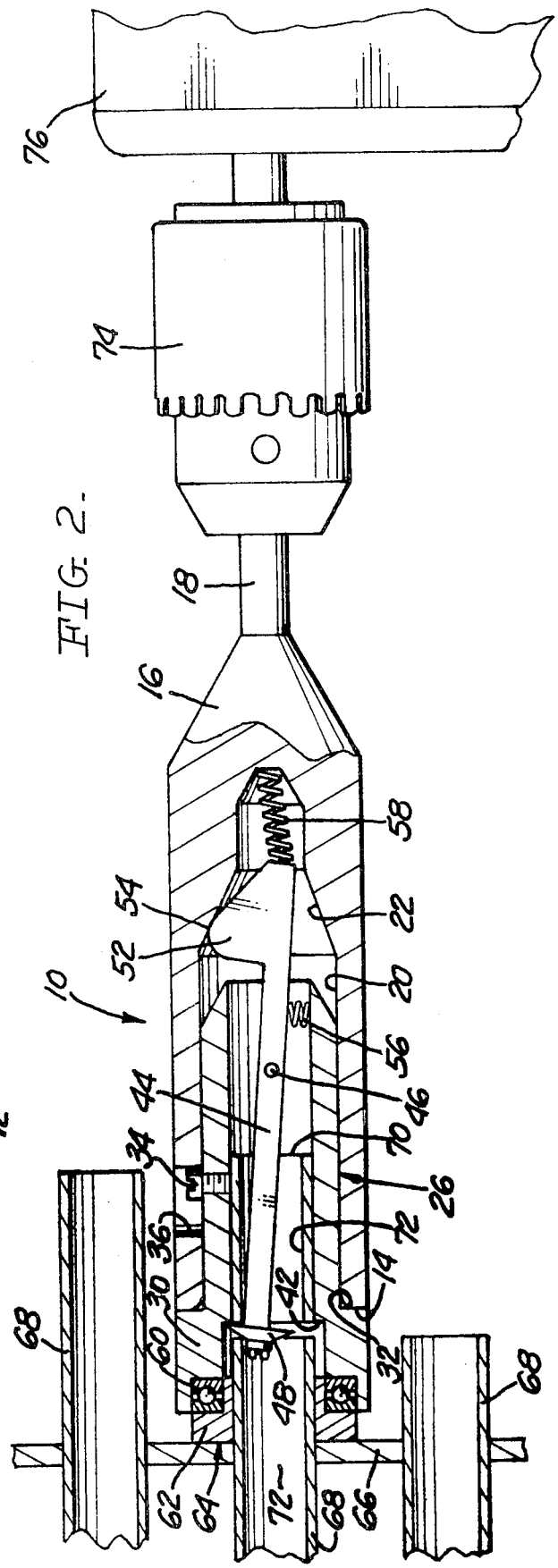

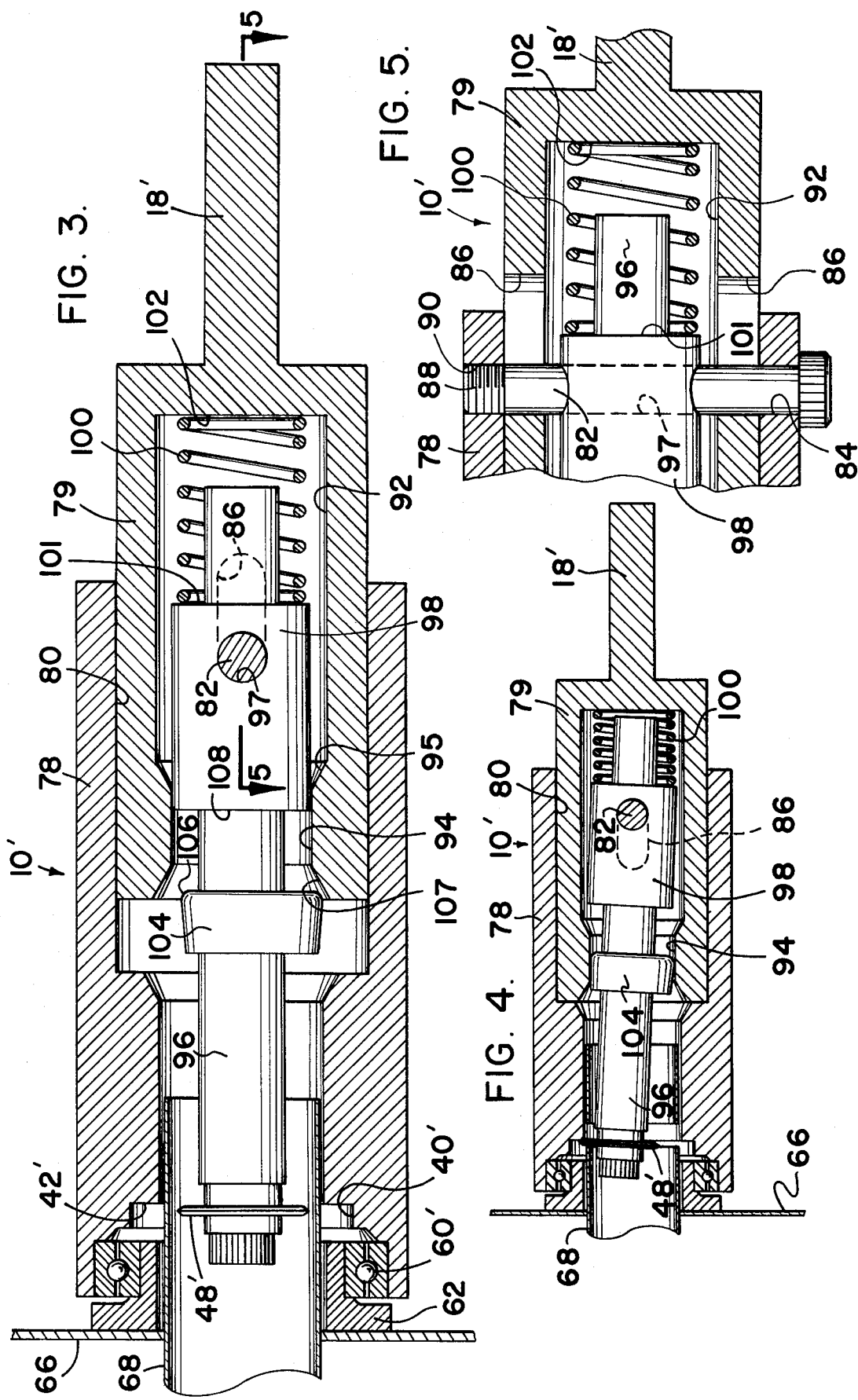

TUBE CUTTER

BACKGROUND OF THE INVENTION

The present invention is directed to tube cutters and, more particularly, is directed to a tube cutter that not only cuts from within the interior of the tube but also can be positioned at a plurality of distances from a support wall.

In the manufacture of heat exchange apparatus the length and shape of the tubing to carry the heat transfer medium is important. Typically, it is necessary in the construction of, for example, an air conditioner condenser, to make sure that the tubes project exactly the same distance from the outer surface of the end wall of the heat exchanger. This is necessary in order that the respective pairs of tube ends may be connected together with U-shaped elbows. When the tubes are not an equal distance from the support wall of the condenser unit, the standard U-shaped elbows will not mate with the respective uneven pair of tubes. These U-shaped elbows are summetrical and will only fit pairs of tubes of the same length.

Another problem with respect to the manufacture of heat exchange equipment is the fact that the tubes are normally very close together. This orientation of the tubes prevents the use of typical tube-cutting devices which swing a radial handle through a 360° turn to cut through from the outside of the tube. The closeness of the tubes prevents the ability to swing such a cutting device.

Therefore, it would be desirable in the construction of heat exchange devices to have a cutting tool for tubes that not only cuts from the interior of the tube, but also sets the cutting edge a fixed distance from a reference surface. Some presently used cutting devices can cut from the interior of the tube, but they do not have the ability to set the cutting edge at a fixed distance from a reference surface.

Since the requirements for the length of the tubes may vary from one heat exchanger to another, a need exists to be able to selectively set the desired distance of the cutting edge from the reference surface.

SUMMARY OF THE INVENTION

The present invention comprises a rotatable sleeve having an interior coupling housing carrying a pivoted cutter arm. The coupling is slidably engaged within the sleeve and is maintained a fixed distance from a reference surface by a removable bushing. One portion of the stationary bushing bears against the reference surface or wall. The bushing is connected to the coupling by a bearing to accommodate the rotative motion of the cutting device while it is in operation.

A tube is received through the bushing and into the hollow coupling adjacent a cutter wheel on the pivoted arm. To place the cutter wheel in engagement with the tube, the sleeve is slidably moved relative to the coupling to pivot the cutter arm.

Consequently, in the manufacture of heat exchange equipment, the present invention has the capability of not only cutting tubes where the tubes are in close proximity to one another, but also insuring that the length of each tube being cut is exactly the same as all the other tubes projecting from the reference surface.

The cutting device of the present invention will greatly ease the assembly process of the tubular path to be traversed by the heat transfer medium. The tube ends projecting from the exchange unit during assembly can be easily and quickly cut to the precise length desired. Subsequently, standard U-shaped elbows can be quickly installed. Therefore, the present invention contributes to more efficient and inexpensive assembly of the heat exchange device.

BRIEF DESCRIPTION OF THE DRAWINGS

FIG. 1 is a longitudinal sectional view of the cutting device in the non-operative position;

FIG. 2 is a longitudinal sectional view of the cutting device in its operational position, showing a tube being cut;

FIG. 3 is a sectional view through another embodiment of the invention, showing the cutter wheel centered in the non-operative position;

FIG. 4 shows the device of FIG. 3, with the cutter wheel in operating position; and FIG. 5 is a fragmentary sectional view taken at 5—5 in FIG. 3.

DESCRIPTION OF THE PREFERRED EMBODIMENT

Attention is directed first to FIGS. 1 and 2, the reference numeral 10 designating the tool in its entirety. The device 10 has a tubular outer housing 12 with an open end 14 and a closed end 16. Formed on the closed end 16 is a projecting shank 18 which is adapted to be gripped by the chuck of a drill (not shown in FIG. 1). The sleeve-like housing 12 has a longitudinal cylindrical bore 20 which narrows toward the enclosed end 16 along a frustoconical cam surface 22 into a central end cavity 24.

Slidably positioned within the housing bore 20 is a hollow coupling or interior housing 26. One portion of the coupling has a reduced exterior diameter designed to fit within the open end 14 of the housing 12. The interior diameter of the housing bore 20 is slightly greater than the diameter of the coupling, so that the housing can slide relative to the coupling as will be explained. The end portion 30 of the coupling has an outside diameter approximately the same as the exterior diameter of the housing 12. A circular ridge or shoulder 32 is formed at the junction between the end portion 30 and the reduced portion 28 of the coupling 26.

Coupling 26 is slidably retained in the housing by a limit screw 34 situated within a longitudinally elongated slot 36. The length of the slot 36 is approximately the same as the distance between the open end 14 of the housing and the shoulder 32 on coupling 26, and this arrangement allows the housing to slide relative to the coupling the length of the slot 36.

Coupling 26 has a longitudinal bore 38 throughout its length, with the end portion 30 having an enlarged area 40 with an interior diameter greater than the interior diameter of the reduced portion 28, forming an interior shoulder 42.

A cutter arm 44 is pivotally mounted within the bore 38 of the reduced portion 28 of the coupling by a pivot pin 46 located at approximately the longitudinal midpoint of the pivot arm. One end of the arm has a cutter wheel 48 rotatably mounted thereon. Formed on the other end of the pivot arm is a cam follower 52 having a bearing curface 54 that rides against the conical cam surface 22. A spring 56 is mounted between the pivot arm 44 and the interior surface of the longitudinal aperture 38 to help keep the arm centered longitudinally within the aperture 38. A biasing spring 58 is positioned between the cam follower 52 and the bottom of cavity 24 in the enclosed end 16 of the housing to urge the outer housing 12 and coupling member 26 to an extended position, as shown in FIG. 1, in which the cam follower 54 is at the bottom of the conical cam surface 22. This orientation maintains the cutting wheel 48 in a central, or centered, position within the device to provide clearance for insertion of a tube for cutting.

Connected to the end portion 30 of the coupling 26 by a bearing 60 is a bushing 62. The bearing allows the bushing to remain stationary when the housing 12 and coupling 26 rotate, so that the forward surface 64 of the bushing can be in stationary contact with a heat exchanger end wall 66 in FIG. 2. The bushing 62 is designed to be removably connected to the coupling 26, so that bushings of various lengths can be used in order to space the cutting wheel 48 at predetermined distances from the end wall 66.

Turning to the operation of the present invention, attention is directed to FIG. 2, where the bushing 62 and coupling 26 of the cutting device 10 are placed over the tube 68 which is to be cut a specified distance from the heat exchanger end wall 66. As stated previously, the cutter device 10 is used primarily in the construction of a heat exchanger having a plurality of parallel tubes 68 extending between two end walls 66, only one of which is seen in FIG. 2. The tubes are anchored in the walls 66 by expanding the diameter of each tube a few thousandths of an inch at its juncture with the wall, which results in a press fit between the wall 66 and the tube 68. The expansion of the tube may be accomplished by drawing a slightly enlarged steel ball through each tube. In the construction of the apparatus, the ends 70 of the tubes usually do not project an equal distance from the end wall 66, and in order to connect respective pairs of tubes with standard U-shaped elbows to form the continuous heat transfer flow path, all the tube ends 70 must be cut to exactly the same length from the wall 66.

The present cutter device 10 is designed to quickly and easily perform the task of cutting each tube to the same length. The forward face 64 of the bushing 62 is placed in contact with the end wall 66 with the tube positioned within the coupling 26, as shown in FIG. 2. The pivot arm 44 with the cutter wheel 48 is inserted into the interior 72 of the tube. The interior bore 38 of the coupling 26 is slightly larger in diameter than the outside diameter of the tube, to allow the tube to slide freely within the coupling and allow close-fitting relative rotation between the coupling and the tube during the cutting operation.

The location of the cut to be made in the tube will be determined not only by the length of the bushing 62, but also by the distance the cutter wheel 48 is recessed within the coupling from the bearing 60. Since the position of the cutter wheel within the coupling is fixed, the only variation which can be made with respect to the position of the cut along the length of the tube is by changing the bushing used to another of greater or lesser length.

Prior to the placement of the bushing 62 in contact with wall 66 and inserting the tube 68 within the coupling 26, the shank end 18 of housing 12 is securely anchored in the chuck 74 of an electric drill 76 which will provide the rotative drive to the device 10. With bushing 62 in contact with the wall 66 and the tube within the coupling 26, an axial or longitudinal force is applied on the housing 12 in the direction toward the wall. This force will overcome the restraining force of the spring 58 and allow the housing to move slidably relative to the coupling 26. As a result, the open end 14 of the sleeve will move from its position in FIG. 1 to the position in FIG. 2, closely adjacent the ridge 32 in the coupling 26. The sliding movement of the sleeve is guided by the slots 36 and limit screws 34.

Simultaneous with the sliding movement of the housing, the arm 44 is caused to pivot. The forward movement of the housing causes the frustoconical cam surface 22 within the sleeve to contact the bearing surface 54 of the cam follower 52 of the arm, and the arm is forced to pivot about the pivot pin 46 to its position in FIG. 2, with the cutter wheel 48 cutting into the interior surface of the tube. The rotative drive of the drill is initiated, and the housing 12, coupling 26, pivot arm 44 and cutter wheel 48 turn in unison. The bushing 62 remains stationary against the wall 66 because of the bearing 60 connected to the coupling. The rotative motion of the pivot arm in its canted position of FIG. 2 causes the cutter wheel 48 to cut through the tube completely at the specified distance from the wall. The shoulder 42 in the coupling provides a cut-off ledge for the cutter wheel.

Once the cutting is completed, the drill is stopped, and the forward pressure on the sleeve 26 is released, allowing the spring 58 to extend the housing to its position shown in FIG. 1 relative to the soupling 26. The centering spring 56 centers the pivot arm 44 to move the cutting wheel out of contact with the tube.

The cutting device 10 is removed from the cut tube and placed over another tube, and the cutting process repeated. Once all the tubes have been cut to equal lengths, connecting elbows can be attached to respective pairs of tubes. As stated previously, the present cutting device can be easily modified to adjust the cut length of the tube by simply selecting a bushing of a length to provide the desired cutting location on the tube.

A second embodiment of the invention is shown in FIGS. 3, 4 and 5, to which attention is now directed. Those parts of this second embodiment that are substantially identical to their counterparts in the embodiment of FIGS. 1 and 2 have been given the same reference numerals as the latter, but with the prime (') suffix.

The tool is designated in its entirety by the reference numeral 10', and comprises a body made up of an outer cylindrical part 78 and an inner cylindrical part 79, which are telescoped together and are axially slidable with respect to one another. Cylinder 79 has a shank 18' projecting from its outer end, which is adapted to be inserted into the chuck of an electric drill. Cylinder 79 is slidably received within a cylindrical bore 80 in the outer cylindrical part 78, and the two cylinders are joined together so that they rotate as one, by means of a transverse pivot pin 82. Pivot pin 82 passes through a hole 84 in one side of cylinder 78, and through longitudinally extending slots 86 in both sides of cylinder 79. Pin 82 has a head 87 at one end, and threads 88 at its other end. The threaded end 88 is screwed into a tapped hole 90 in cylinder 78. Thus, pivot pin 82 causes the two cylinders 78 and 79 to rotate together, but allows a limited amount of relative axial sliding movement, to the extend of the length of slot 86. The inner end of cylinder 79 is free to move to the left (as viewed in FIG. 3) a distance at least equal to the length of travel permitted by the slots 86.

The inner cylindrical body 79 is bored out to provide a co-axial, cylindrical cavity 92 that opens at the inner end (i.e., the left-hand end in FIG. 3) of cylinder 79. Near the inner end of cylinder 79, the cavity is reduced in diameter to form a smaller bore 94, and at the right-hand end of bore 94 is a sloping conical surface 95 that serves as an inclined ramp, as will be explained presently.

Disposed centrally within the cavity 92 and bore 94 is a cutter arm 96, one end of which has a cutter wheel 48' rotatably mounted thereon. The cutter arm 96 is pivotally mounted on the pivot arm 82, which passes through a hole 97 in the arm. Cutter arm 96 has a concentric cylindrical enlargement 98 formed thereon, most of which lies within the cavity 92 when the tool is not being used, but a small end portion of which is slidably received within the smaller bore 94. The outside diameter of cylindrical enlargement 98 is only slightly smaller than the diameter of the bore 94, so that the enlargement 98 slides freely in the bore 94 but is otherwise a snug fit therein. The purpose of the cylindrical enlargement 98 and bore 94 is to center the arm 96 within the cavity so that it lies on the axis of the cylindrical bodies 78 and 79, as shown in FIG. 3, with the cutter wheel 48' centered in the non-cutting position.

The cutter arm 96 is centered within its cavities, as described above, when cylindrical bodies 78 and 79 are extended to the maximum length, as in FIG. 3. Extension of the bodies 78, 79 is accomplished by means of a compression spring 100, one end of which abuts against an annular shoulder 101 formed by the right-hand end of enlargment 98, while the other end of the spring is seated against the bottom 102 of cavity 92. Spring 100 urges the inner cylindrical body 79 to the right, as viewed in the drawings, while pressing the cutter arm 96 and outer cylindrical body 78 to the left. Relative sliding movement between the bodies 78 and 79 is limited by the slots 86, and FIGS. 3 and 5 show the bodies 78, 79 fully extended, with pivot pin 82 contacted by the left-hand ends of slots 86.

Mounted eccentrically on the cutter arm 96 ahead of cylindrical enlargement 98 is a frusto-conical cam member 104 having a rounded edge 106. The sides of the frusto-conical cam member 104 are sloped at a very slight angle, so that when the cutter arm 96 is tilted about the pivot pin 82, as shown in FIG. 4, one side of the frusto-conical surface lies flat against the cylindrical bore 94. Cam member 104 is slightly smaller in diameter than the bore 94, and slides freely therein when members 78 and 79 move axially with respect to one another. Member 104 is eccentrically offset with respect to the axis of the cutter arm 96 in the direction perpendicular to the axis of the pivot pin 82, and therefore when member 104 is seated within the bore 94, the cutter arm is tilted about the pivot pin 82, as shown in FIG. 4. This tilting of the cutter arm causes the cutter wheel 48' to move toward the inner surface of the tubing while the tool rotates, until the cutter wheel has cut through the tubing.

Member 104 is cammed into the bore 94 by means of a conical cam surface 107, which engages the rounded edge 106 of member 104 when the inner cylindrical member 79 is moved toward the left by pressure exerted by the operator through the electric drill 76 and its chuck 74. The conical cam surface 107 raises the member 104 until the latter is centered with respect to bore 94, at which point the member 104 slides into the bore, as shown in FIG. 4. Thus, when the operator pushes the electric drill 76 toward the wall 66, inner cylindrical body 79 slides axially into body 78, and the relative movement causes the cutter arm 96 to pivot so that cutter wheel 48' cuts through the tubing 68 as the tool revolves. When the operator releases pressure on the drill 76, spring 100 extends the body 79, causing the cam member 104 to be withdrawn from the bore 94. As soon as the cam member 104 is entirely clear of the bore 94, the left-hand edge 108 of enlargement 98 is slidably engaged by the sloping conical surface 95, and member 98 is guided into the bore 94 to the position shown in FIG. 3. As the member 98 is raised and guided into the bore 94, the cutter arm is pivotally moved to the centered, non-cutting position, in readiness for the next tube-trimming operation. As in the embodiment of FIGS. 1 and 2, tool 10' has replaceable spacer bushings 62' of various lengths, which can be used to space the cutter wheel 48' at predetermined distances from the end wall 66.

While I have shown and described in considerable detail what I believe to be the preferred form of my invention, it will be understood by those skilled in the art that the device is not limited by such details, but could take various other forms within the scope of the claims.

What I claim is:

1. A cutter apparatus for cutting tubes a fixed distance outward from a support wall, said cutter apparatus comprising:

a cylindrical housing having an open end, an interior cam surface, and a closed end;

connecting means located on said closed end of said housing for receipt of drive means for rotating said housing;

a hollow tubular coupling having one end slidably mounted within said open end of said housing and the other end having a central bore to closely receive one of said tubes, said coupling being slidably movable between a first position and a second position relative to said housing;

an elongated arm pivotally mounted on said coupling within said coupling and said housing;

a cutter wheel attached to one end of said arm;

a cam follower on said arm engageable with said cam surface such that relative sliding movement between said housing and said coupling pivots said arm; and a removable bushing connected to said coupling to provide the selective attachment of variable length bushings for positioning said cutter wheel a predetermined fixed distance from said support wall.

2. A cutter apparatus as defined in claim 1, wherein said bushing is connected to said coupling by a bearing to permit said bushing to remain stationary against said wall when said coupling and said housing are axially rotated by said drive means.

3. A cutter apparatus as in claim 1, wherein said hollow coupling has an enlarged interior portion adjacent said bushing forming a cutting ledge in radial alignment with said cutter wheel to enhance the cutting of said tube by providing a coacting shearing surface.

4. A cutter apparatus for cutting tube ends a fixed distance outward from a support wall, said apparatus comprising:

a pair of hollow, coaxial members telescopically joined together for a limited amount of relative axial movement; one of said members having an internal cam surface;

connecting means located on said one member for receipt of drive means for rotating said one member;

the other of said members being turned with said one member and having a removable bushing connected at one end thereof to abut the support wall around the tube end to be cut;

spring means acting against said members to yieldingly extend the same;

a cutter arm disposed within said hollow members and having a cutter wheel rotatably mounted on one end thereof, said cutter arm being pivotally connected to said other member for angular movement between a centered, non-cutting position, and an angled cutting position; and a cam follower on said arm engageable with said cam surface such that relative axial movement between said two members pivots said cutter arm from one of said positions to the other.

* * * * *